United States Patent Office 3,493,716
Patented Feb. 3, 1970

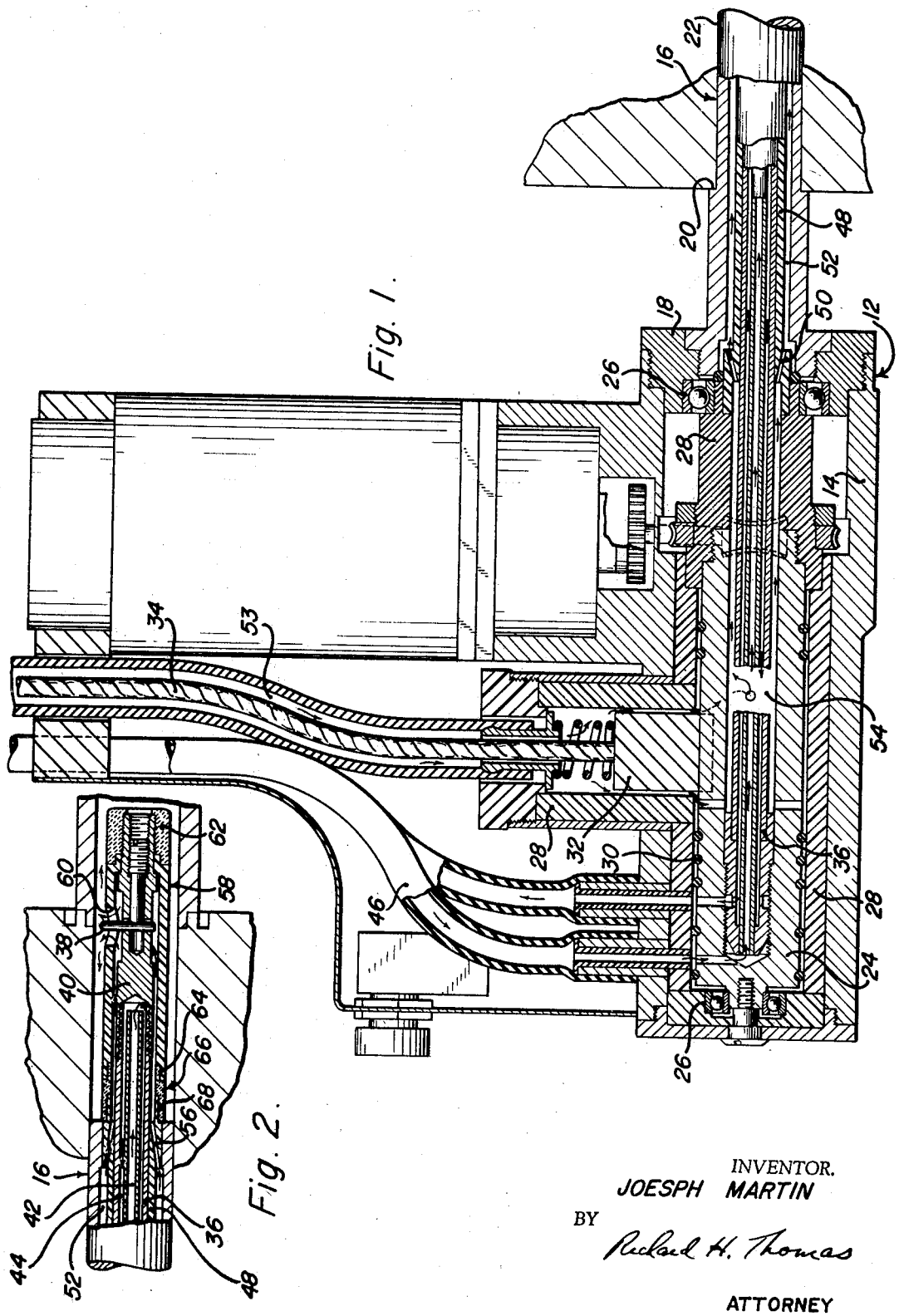

3,493,716
INTERNAL TUBE WELDING TORCH
Joseph Martin, East Menlo Park, N.J., assignor to Foster Wheeler Corporation, Livingston, N.J., a corporation of New York
Filed Aug. 21, 1967, Ser. No. 662,017
Int. Cl. B23k 9/12
U.S. Cl. 219—125                    8 Claims

ABSTRACT OF THE DISCLOSURE

An internal tube welding torch for very small bores or openings in which a Teflon or heat resistant plastic tube is used in place of a conventional ceramic tube as electrical insulation around the current carrying portion of the torch. The use of Teflon permits a thinner wall thickness for the insulating tube, permitting in turn the use of a current carrying member of increased thickness for higher amperage currents.

---

The present invention relates to improvements in an internal tube welding torch.

Internal tube welding in essence involves inserting an electric welding torch through a bore of a tube sheet positioning an electrode at the plane of the joint between the tube sheet and a tube to be welded to the tube sheet.

The elecrode is rotated and the traveling arc causes a fusion of the tube to the tube sheet at the plane of the arc.

U.S. Patent No. 3,084,243, issued to Ronald W. Gotch, illustrates, in FIGURE 6, an internal tube welding torch which has proven to be a superior torch for welding tubes to tube sheets, and is widely used today.

The procedure frequently used for internal tube welding involves machining short tubular extensions or spigots on the tube sheet around each hole, and the tubes are connected or butt welded to the extensions. The reason for this is to provide a heat mass in the tube sheet equal to the mass in the tube at the plane of the joint to facilitate welding. A principal disadvantage with this method is the substantial expense involved in forming the extensions or spigots. Another disadvantage is that laminations which occur in the base metal during the forging step show up in the spigots and may be a source of leakage. A further disadvantage is that the extensions must be submerged in flux to prevent contact of air with the weld and oxidation of the weld metal. This means that the tubes and tube sheets must be vertically oriented during welding so that the flux can be piled around the weld joint on the outside thereof, and with present-day feedwater heaters utilizing this type of welding, few installations are capable of handling the lengths of tube involved in a vertical plane.

U.S. patent application Ser. No. 564,211, filed July 11, 1966, on the behalf of William R. Apblett, describes an improved tube welding technique overcoming the disadvantages of the conventional procedure. In this system, a socket of predetermined depth is first formed in one surface of the tube sheet around each tube sheet hole. The tubes are then inserted or telescoped within the sockets until the ends of the tubes abut the base of the sockets. Following this, the tubes are fusion welded to the tube sheet along the zone of abutment of the tube end and socket base by means of an internal tube welding device.

Although this method overcame the numerous disadvantages of prior welding procedures, the method created one problem, that of welding the relatively small mass of metal of the tube to the infinite mass of metal in the tube sheet. The cooling effect of the relatively great mass of the tube sheet limited the depth of weld penetration obtained with a conventional welding torch to less than the tube wall thickness. It was discovered, however, that the use of a greater welding current could provide the penetration desired, but this created the requirement that a new torch be developed capable of handling the greater current.

One obvious requirement for greater current carrying capability is that a thicker or heavier current carrying member be used. However, some further developments in the manufacture of feedwater heaters made this objectionable, one being a trend towards higher pressures in feedwater heaters forcing manufacturers to go to thicker or heavier walled tubes of smaller diameter. Even prior to this trend, the bore diameter in a tube sheet was small, and the torch of the Gotch Patent No. 3,084,243 was significant in that it provided for gas shielding and improved cooling despite the smallness of the bore. It was apparent that redesign of the torch was necessary to accommodate a thicker current carrying member, particularly with smalled diameter tubes.

In the torch described in the Gotch Patent No. 3,084,243, a ceramic gas cup surrounds the electrode holder designed to withstand the high heat created by the welding operation. The gas cup confines the flow of a shielding gas to the general area of the arc, and as ceramic is a relatively brittle material, the ceramic cup is fairly thick. Conventionally, the ceramic cup is continued upwardly to the torch body as a ceramic tubular layer encompassing the torch current carrying member or portion, insulating the latter from other components of the torch and from the tube sheet.

In accordance with the invention, it was discovered that an improved torch of over-all smaller diameter could be made by providing a fairly short ceramic member as a gas cup in the area of the welding electrode and making the remainder of the insulating layer of a thinner plastic material, capable of withstanding high temperatures, for instance "Teflon" (polytetrafluoroethylene). To prevent the transmission of excess heat from the gas cup to the Teflon layer, a heat insulating bushing of a material such as "transite" is positioned between the gas cup and the Teflon.

The invention and advantages thereof will become apparent upon further consideration of the specification, with reference to the accompanying drawings, in which:

FIGURE 1 is a section view of the motor end of the welding torch in accordance with the invention; and FIGURE 2 is a section view of the electrode end of the welding torch in accordance with the invention.

Referring to the drawings, the torch 12 comprises a housing consisting of a hollow cylindrical body portion 14 from which there extends a hollow cylindrical pilot member 16 of predetermined length. The pilot member 16 is threaded into a bushing 18 which in turn is threaded into an open end of the body member 14. Particular pilot members are machined for specific tube sheet bore diameters, the surface 22 of the pilot member producing a close fit within the tube sheet bore to accurately center the pilot member within the bore, and the seat 20 being adapted to rest against a surface of the tube sheet positioning the pilot member a predetermined distance within the tube sheet bore.

Within the body member 14, a distributor 24 is mounted in ball bearings 26 for rotation within the body member, and is suitably sealed within insulating sleeves 28 within the body member 14 by O-rings 30. A sliding contact 32 is spring held against the distributor 24 providing an electrical current to the distributor via current line 34 as the distributor is rotated.

Screw seated within the upper end of the distributor 24 is an elongated copper current carrying tube or member 36 which conveys an electrical current to electrode 38, the latter being held in electrode holder 40 screw-threaded to the free or distal end of current carrying tube 36. The reason for the hollow copper tube 36 as a current carrying member is that it provides a means for water cooling the torch, water flowing downwardly within the inner water conduit 42 positioned within the current carrying member 36, and flowing outwardly in the space 44 between the water carrying tube 42 and current carrying tube 36. Water lines 46 connect to the torch body and to a suitable source.

A "Teflon" insulating sleeve 48 fits tightly against and around the copper current carrying tube from near the bottom of the tube (adjacent its distal end) to a point within the body of the torch but removed from the torch upper end. In this instance, the "Teflon" insulating sleeve upper end fits tightly within the lower end of the insulating sleeve 28 encompassing the distributor 24, slightly above the connection of the pilot member 16 to the torch body 14. The "Teflon" sleeve 48 at its upper end is provided with circumferentially spaced holes 50 permitting argon gas within the body of the torch to flow into the passageway 52 between the outer pilot member 16 and the "Teflon" sleeve 48. The argon gas is introduced via conduit 53 into space 54 of the torch body and flows downwardly in passageway 52 to lower circumferentially spaced openings 56 near the bottom of the "Teflon" sleeve 48.

As mentioned, a narrow elongated metallic electrode holder 40 is screw threaded onto the distal or free end of the current carrying tube 36. The electrode holder is encompassed by a thickened ceramic gas cup 58 having an opening 60 through which the electrode 38 projects, the gas cup being retained on the holder 40 by a nut 62 screw threaded onto the holder.

At the upper end of the gas cup, the latter is flanged (by flange 64) to seat a bushing or adapter 66, the bushing at its upper end being seated against the "Teflon" sleeve 48. In the embodiment shown, an upper flange portion 68 of the bushing is engaged by a portion of the sleeve 48 and the pilot member 16. The bushing is made of a heat resistant and heat insulating material, for instance, "Transite" to protect the "Teflon" sleeve from the excessive heat of welding and high temperature attained by the gas cup 58.

By virtue of the fact that the "Teflon" sleeve can be made substantially thinner than the conventional ceramic insulating cover, and still retain its electrical insulating capability, the inner barrel of the torch consisting of the water carrying conduits 42, the copper current carrying tube 36 and the "Teflon" sleeve is smaller in over-all diameter with respect to the conventional torch, even with an enlarged diameter for the copper current carrying tube. This in turn permits a smaller diameter for the pilot member permitting the use of the torch with smaller diameter tube and tube sheet bores.

In operation, the pilot member 16 slides within the tube sheet bore loosely engaging the walls of the tube sheet and aligning the axis of rotation of the electrode 38 with the axis of the tube sheet bore. Referring to FIGURE 2, the pilot member remains stationary while the inner assembly comprising the copper current carrying member 36, sleeve 48 and water conduit 42 rotates with the electrode 38. For this rotation, "Transite" bushing 66 is in sealing engagement with the outer pilot member 16 at the distal end of the latter, forcing gas in passageway 52 to flow through lower openings 56 into the interior of the gas cup 58.

In an example in accordance with the invention, a typical high pressure feedwater heater tube has a three-quarter inch outside diameter and 0.085" wall thickness. It was desired to increase tube wall thickness up to 0.106" in order to accommodate the higher operating pressures of current feedwater heater designs. The tubing was still three-quarter inch outside diameter.

Minimum welding speed is about one inch per minute (based on the tube outside diameter). Ordinary welding speeds of three inches per minute and higher are used for tungsten arc welding, and may be as high as five inches per minute. It was not seen possible to achieve greater penetration by further reducing travel speed.

The torch in accordance with the invention was capable of operation at 200 amperes, as compared with a conventional amperage of about 100 amps, an increase of current carrying capability of about 30%.

A material commonly employed for feedwater heater tube sheets is ASME SA–266, Class 2, carbon steel drum forging material. This is a killed carbon steel containing 0.35% max. carbon, 0.40 to 0.90% manganese, and 0.15 to 0.35% silicon. The tube material specified for carbon steel tubed feedwater heaters meets the properties of SA–106, Grade C seamless pipe (70,000 p.s.i. minimum tensile strength). The carbon content of this material is specified to be 0.27% maximum, which is lower than the 0.35% maximum carbon allowed in the SA–106, Grade C specification. This material has 0.29 to 1.06% manganese and 0.10% minimum silicon.

Owing to the anticipated problems of making a fusion weld directly between the relatively high carbon content tube sheet forging and tube materials, with little or no preheat, a low carbon steel overlay having a nominal composition of 0.10 to 0.12% carbon, 0.70 to 0.85% manganese and 0.20 to 0.30% silicon was applied to the primary side of the tube sheet, about ⅜" in thickness.

Using 0.106" wall tubing at a travel speed of 1.2 inches per minute (85 seconds per revolution), full penetration was achieved with a current level of about 160 amperes. If the current was increased to 180 amperes, weld metal flow was noted caused by the force of the arc plasma. For socket welds located at the periphery of a tube layout it was necessary to reduce the travel speed to one inch per minute or 100 seconds per revolution to achieve full penetration.

It was also discovered that whereas the conventional spigot type of weld joint heretofore required a complex gas pressurization system to control the weld metal contour, the surface tension forces using the socket joint and the presence of inert shielding gas was sufficient to produce a relatively uniform weld contour. When surface oxidation is allowed to occur, however, surface tension is reduced, and uncontrolled weld metal flow becomes a problem.

Although the invention has been described with respect to specific embodiments, variations within the scope of the following claims will be apparent to those skilled in the art.

What is claimed is:

1. A welding torch assembly for internal tube welding comprising:
   an outer elongated tubular pilot member;
   an inner assembly within the pilot member comprising an elongated current carrying member, said current carrying member including a supported end and a distal end;
   an electrode holder connected to the distal end of the current carrying member;
   a radially extending electrode connected to the electrode holder;
   means rotatably supporting said inner assembly;
   said inner assembly further including a plastic elongated tubular electrical insulating sleeve encompassing and contiguous with said current carrying member between the ends thereof insulating the current carrying member from the pilot member;
   a cylindrical ceramic gas cup encompassing said electrode holder including an opening in the side thereof through which the electrode extends;
   bushing means longitudinally interposed between said gas cup and said insulating sleeve, said bushing means being in sliding contact with the inner surface of said pilot member, and of a material to protect the insulating sleeve from the transmission of heat from the gas cup.

2. A welding torch according to claim 1 wherein said insulating sleeve and pilot member are dimensioned so as to be in spaced apart relationship to define an annular gas passageway, said bushing, said insulating sleeve and said gas cap having interconnected flanges for sealing the end of said passageway, and further, said insulating sleeve including aperture means between said passageway and the gas cap for the flow of gas into the latter.

3. A welding torch according to claim 1 wherein said insulating sleeve is "Teflon."

4. A welding torch assembly for internal tube welding comprising:
   an outer elongated tubular pilot member;
   an inner assembly within the pilot member comprising an elongated tubular current carrying member, said current carrying member comprising a supported end and a distal end;
   support means ratatably supporting said current carrying member at said supported end;
   means to supply an electrical current to said current carrying member;
   an electrode connected to said current carrying member at the distal end thereof, said support means positioning the electrode in a predetermined plane removed from the support means;
   said inner assembly further comprising a plastic elongated tubular electrical insulating sleeve of an electrically insulating material covering said current carrying member except for said distal end;
   said insulating sleeve and pilot member being dimensioned to define a longitudinally extending annular gas passageway therebetween;
   a cylindrical heat insulating bushing supported at the end of said insulating sleeve adjacent to the distal end of the current carrying member;
   a ceramic gas cup encompassing said current carrying member at the distal end thereof supported by said heat insulating bushing removed from said insulating sleeve by the bushing and rotatable with the sleeve and bushing, said gas cup including an opening through which said electrode extends;
   said bushing including a flange having an outer surface in sliding contact with an inner surface of the pilot member sealing the lower end of said gas passageway;
   said inner assembly further including passageway means by which an inert gas is transmitted from said annular gas passageway to said gas cup around the distal end of said current carrying member.

5. A welding torch assembly according to claim 3 wherein said inner assembly further includes a water conduit extending to the distal end of said current carrying member disposed within the current carrying member but spaced therefrom to define concentric annular passageways for the flow of cooling water within the torch.

6. A welding torch assembly according to claim 3 wherein the material of said insulating sleeve is "Teflon."

7. A welding torch assembly according to claim 3 wherein the material of said bushing is "Transite."

8. A welding torch assembly for internal butt welding of a tubular member to a plate member, the latter having an opening coextensive with said tubular member, said assembly comprising:
   a housing;
   an electrical distributor insulated from and supported within the housing for rotation therein;
   means to rotate said distributor;
   means to supply an electrical current to the distributor;
   an elongated tubular current carrying member supported by and connected to said distributor for rotation therewith;
   an electrode holder attached to the current carrying member at the end thereof remote from said distributor;
   an electrode connected to said electrode holder extending radially therefrom with respect to its axis of rotation;
   said housing including a pilot member dimensioned for insertion within said plate member opening dimensioned to center said welding torch so that the axis of rotation of the current carrying member and distributor is coaxial with the axis of the tube plate opening;
   said torch further including a plastic elongated tubular electrical insulating sleeve encompassing and contiguous with said current carrying member insulating the latter from the pilot member;
   a shortened cylindrical ceramic gas cup encompassing the electrode holder in the area of the electrode having an opening through which the electrode extends;
   heat resistant bushing means connecting the gas cup to said insulating sleeve, said bushing means being in sliding contact with the inner surface of said pilot member and of a material to protect the insulating sleeve from the transmission of heat from the gas cup;
   gas supply means for supplying arc shielding gas to the ceramic gas cup; and
   flange means for interconnecting and holding said gas cup, heat resistant bushing means and plastic sleeve in end-to-end tandem abutting relationship.

References Cited

UNITED STATES PATENTS

| 2,835,783 | 5/1958 | Watson | 219—130 |
|---|---|---|---|
| 2,868,953 | 1/1959 | Gardner | 219—125 |
| 3,084,243 | 4/1963 | Gotch | 219—60 |
| 3,324,225 | 6/1967 | Thostrup | 219—130 |
| 3,350,537 | 10/1967 | Lawrence et al. | 219—125 |

FOREIGN PATENTS

| 244,163 | 8/1960 | Australia. |
|---|---|---|
| 1,045,149 | 10/1966 | Great Britain. |
| 1,097,614 | 1/1968 | Great Britain. |
| 1,483,662 | 4/1967 | France. |

JOSEPH V. TRUHE, Primary Examiner

L. A. SCHUTZMAN, Assistant Examiner

U.S. Cl. X.R.

219—60